July 26, 1960
M. B. JOHNSON
2,946,514
MOBILE SPRAY APPARATUS
Filed April 26, 1957
2 Sheets-Sheet 1
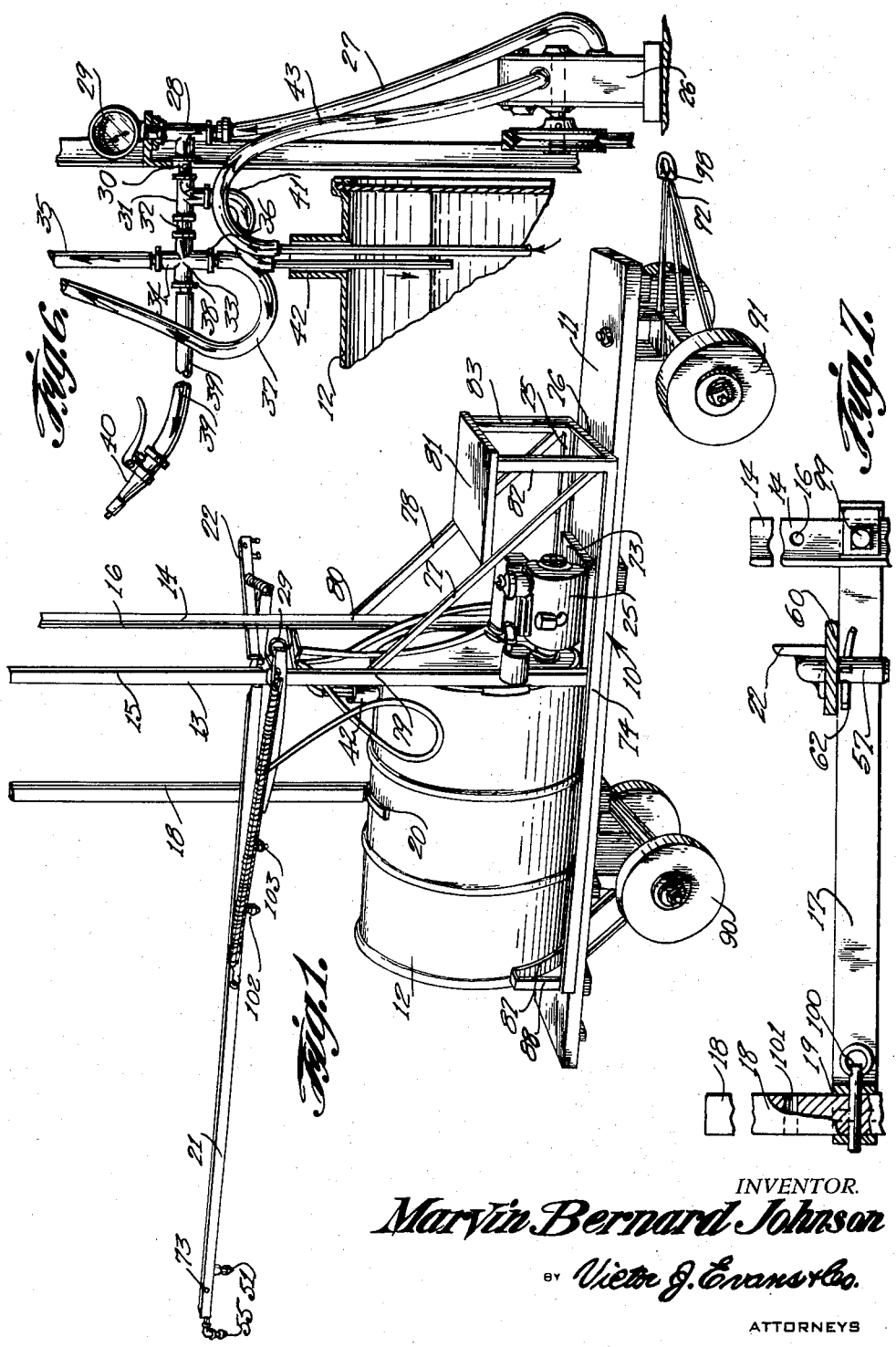
INVENTOR.
Marvin Bernard Johnson
BY Victor J. Evans & Co.
ATTORNEYS July 26, 1960
M. B. JOHNSON
2,946,514
MOBILE SPRAY APPARATUS
Filed April 26, 1957
2 Sheets-Sheet 2
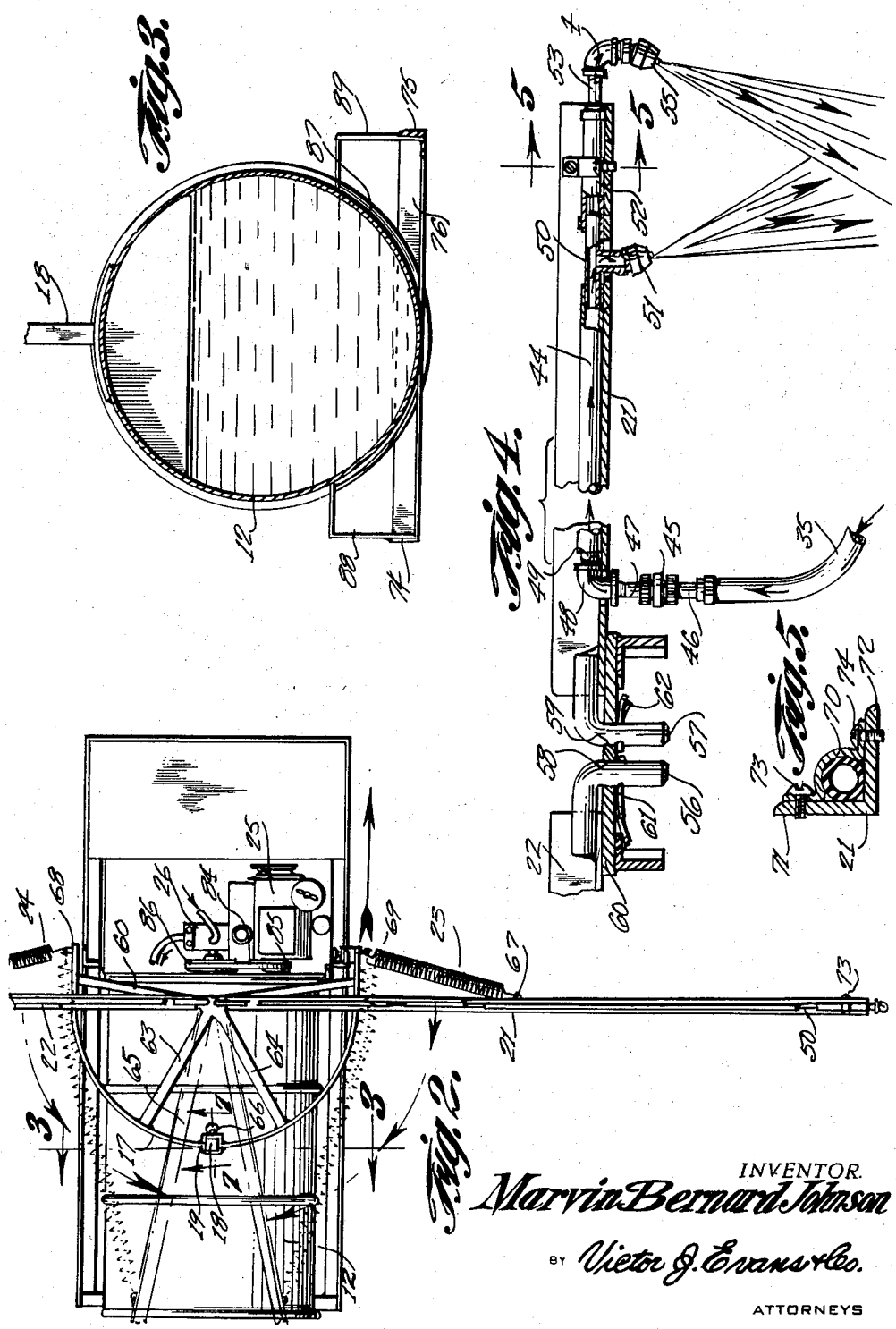
INVENTOR.
Marvin Bernard Johnson
BY Victor J. Evans & Co.
ATTORNEYS

United States Patent Office 2,946,514
Patented July 26, 1960

2,946,514

MOBILE SPRAY APPARATUS

Marvin Bernard Johnson, Pendleton, N.C.

Filed Apr. 26, 1957, Ser. No. 655,295

1 Claim. (Cl. 239—127)

This invention relates to spraying devices for spraying tobacco beds for blue mold and for spraying small and tall plants of tobacco, cotton, Irish potatoes, beans, fruit trees and also livestock and the like, and in particular a pair of pivotally mounted spraying arms carried by a frame having a storage tank or drum and also a motor driven pump thereon whereby with the frame positioned on a tobacco sleigh and drawn by a mule walking between two rows of tobacco, four rows of the tobacco plants are sprayed in each trip across a field.

The purpose of this invention is to provide a spraying device adapted for spraying the soil, weeds, and other products, which is also adapted to be adjusted for spraying both sides of rows of tall plants.

Various types of spraying devices have been provided, however, with conventional devices of this type, the material is broadcast and relatively small proportions reach the actual plants and particularly under surfaces of the leaves thereof. Furthermore with conventional spraying devices, the parts are adjustable to cover small plants, however, after the plants are mature, it is difficult, or not possible, to spray the tall plants without injury to the plants.

With this thought in mind, this invention contemplates a spraying unit in which a solution is sprayed from pairs of inwardly inclined nozzles, which are positioned to straddle rows of plants whereby the solution is sprayed in under the leaves and in which the spraying elements are adjustable to different elevations to compensate for height of the plants.

Another object of the invention is to provide a spray device for tall plants in which the device is also designed to spray tobacco beds for blue mold.

Another important object of the invention is to provide a device particularly adapted for spraying tobacco which may also be used for destroying sheep burr weeds, morning-glories, and other similar products.

A further object of the invention is to provide a spray device designed for use for both small and tall plants in which the device is of a simple and economical construction.

With these and other objects and advantages in view the invention embodies a frame designed to be positioned upon the platform of a tobacco sleigh, a drum positioned on the frame, a motor driven pump also positioned on the frame, a horizontally disposed semi-circular band providing a fifth wheel, adjustably mounted on posts extended upwardly from the frame, a pair of booms or arms pivotally mounted on the fifth wheel and formed to extend laterally or longitudinally, spaced pairs of spray nozzles carried by the booms or arms, and a hose having a hand nozzle thereon for use in spraying fence rows in other inaccessible locations.

Other features and advantages of the invention will appear from the following description taken in connection with the drawing, wherein:

Figure 1 is a side elevational view of the improved spray unit with the parts illustrated in operative positions.

Figure 2 is a plan view of the spray unit with the spray nozzle carrying arms extended laterally with one of said arms broken away, and also with the arms shown in collapsed or longitudinally disposed positions in broken lines.

Figure 3 is a cross section through the intermediate portion of the frame taken on line 3—3 of Figure 2 with the parts shown on an enlarged scale and showing, in particular, the position of the drum on the frame.

Figure 4 is a cross sectional view with parts broken away and with the parts on an enlarged scale showing, in particular, one of the spray nozzle retaining arms with a pair of spray nozzles on inner portions of the arms omitted.

Figure 5 is a cross section through one of the arms taken on line 5—5 of Figure 4 illustrating the mounting of one of the spray carrying tubes on the arm.

Figure 6 is a fragmentary view of the spraying unit showing the forward end of the drum in combination with the pump and with other parts broken away, illustrating, in particular, the supply connection of the pump to the gauge and tank or drum and also the by-pass connection.

Figure 7 is a section taken on line 7—7 of Figure 2 illustrating the mounting of the band or fifth wheel on the vertically disposed post with parts omitted, with parts broken away and also with parts shown in sections.

Referring now to the drawing wherein like reference characters denote corresponding parts, the improved spraying device of this invention includes a frame 10 formed to be positioned on a platform 11 of a tobacco sleigh, a drum 12 positioned on the frame, spaced posts 13 and 14 with rows of vertically disposed openings 15 and 16 therein, a semi-circular band 17 mounted in a horizontal position and carried by the posts, a strut 18 extended through a socket 19 in the outer portion of the band and secured by a support 20 on the upper surface of the drum, arms 21 and 22 mounted to slide on the band 17, springs 23 and 24 for retaining the arms in outwardly extended positions, a motor or engine 25 mounted on the frame and a pump 26 also mounted on the frame and connected by hose or a tube to the drum or reservoir 12 and to nozzles on the arms 21 and 22.

As illustrated in Figure 6, the discharge side of the pump is connected by a hose or spray tube 27 to a T 28 on which a pressure gauge 29 is positioned, and one side of the T is connected by a nipple 30 to a T 31 and the T 31 is connected by a nipple 32 to a cross 33, one side 34 of which is connected by a tube 35 to one of the arms, such as the arm 22, and the other side 36 of which is connected by a tube 37 to the other arm, such as the arm 21. The other connection 38 of the cross provides means for connecting a hose 39 having a hand nozzle 40 thereon to the system and although the hose 39 is illustrated as being comparatively short, this hose may be of sufficient length to permit spraying along fence rows and in corners and in other relatively inaccessible locations.

The T 31 is provided with a side connection from which a tube 41 extends. The tube 41 extends downwardly through a nipple 42 on the upper end of the tank 12 providing a by-pass. The pump is also provided with a suction connection or supply tube 43 that extends downwardly through the nipple 42 providing a supply connection.

The connections 35 and 37 extend to tubes 44 on the arms 21 and 22 and, as illustrated in Figure 4, the tube 37 is connected to a coupling 45 through a nipple 46 and the coupling is connected by a nipple 47 to a fitting 48 from which a nipple 49 extends. The tube 44 extends from the nipple 49 to a fitting 50 from which a spray nozzle 51 extends and the opposite side of the spray nozzle is connected by a tube 52 to a nipple 53 on the outer end of which an elbow 54 is provided and a spray nozzle 55 is positioned in the lower side of the elbow. The nozzles 51 and 55 are inclined inwardly to facilitate spraying material around the plants and particularly under the leaves.

The arms 21 and 22 are mounted by pins 56 and 57 in openings 58 and 59, respectively, in a cross bar 60 whereby the arms are mounted to extend laterally, as illustrated in Figure 2, or longitudinally as indicated by the broken lines in the same figure. The pins 56 and 57 are provided with cotter pins 61 and 62 to prevent accidental displacement of the inner ends of the arms.

The band 17 is supported by outer ends of the cross bar 60 and the intermediate part of the band is retained in position by arms 63 and 64. With the arms or spray headers supported by a semi-circular band or fifth wheel 17 the arms are rigidly held and will not swing around in use.

The post 18 extends through the socket 19 in the center of the band 17 and, as shown in Figure 2, the socket is provided with hooks 65 and 66 to hold the arms 21 and 22 in folded or collapsed positions to facilitate traveling through gates, doors of barns, and the like.

The arms 21 and 22 are provided with eyes 67 to which outer ends of the springs 23 and 24 are attached and, as illustrated in Figure 2, the opposite ends of the springs are connected to ends 68 and 69 of the band 17 whereby the arms are urged to forwardly extended positions, as shown in Figure 2.

The arms are also provided with clips 70, as shown in Figure 5, which are secured to flanges 71 of the arms by screws or other fasteners as indicated by the numeral 72.

The motor 25 and pump 26 are positioned on a mounting plate 73, as shown in Figure 1, on the frame 10. The plate 73 extends between side rails 74 and 75, the ends of which are connected with cross rails 76 and the frame is provided with diagonally positioned braces 77 and 78 which are attached to the posts 15 and 16 at points 79 and 80 whereby, the posts are retained in vertically disposed positions. The frame is also provided with a seat 81, the rear edge of which is secured to the braces 77 and 78, and the forward edge of which is supported by posts 82 and 83.

The pump 26 is driven by the motor 25 through a belt 84 that is trained over a pulley 85 on the motor also over a pulley 86 on the pump. The frame is also provided with a saddle 87 that is supported from the side rails 74 and 75 with struts 88 and 89.

The tobacco sleigh 11 is conventional, and as illustrated in Figure 1, the sleigh is supported upon wheels 90 at the rear, and 91 at the forward end, and the forward end is provided with a tongue 92 with a clevis 93 and the end thereof by which the device may be connected to a single-tree so that it may be pulled by a donkey, or the like.

In use, the band upon which the arms 21 and 22 are carried is set to a desired elevation, preferably just above the tops of plants, with the cross bar 60 adjusted on the posts 13 and 14 with pins 99 which extend through openings in the ends of the band 17 and the openings 15 and 16 of the posts and also with pins 100 in similar opening 101 of the post 18 and with these arms in position an operator on the seat 81 drives a mule, or the like, hitched to the sleigh along a row or between rows of tobacco plants with the spray nozzles 51 and 55 and the ends of the arms 21 and 22 straddling rows of tobacco plants and with pairs of spray nozzles, as indicated by the numerals 102 and 103 on inner portions of the arms also straddling rows of tobacco plants whereby four rows of plants are sprayed as the machine travels across the field.

The operator may also take the nozzle 40 to spray plants on either side of the machine, or the nozzle 40 which may be connected to the pump with considerable length of hose may be used for spraying, along fence rows, in corners and in other inaccessible locations.

At the end of the season, the spraying solution may be removed from the drum and the drum filled with water so that the device may be used as a fire extinguisher or as desired.

It will be understood that modifications, within the scope of the appended claim, may be made in the design and arrangement of the parts without departing from the spirit of the invention.

What is claimed is:

In a sprayer, the combination which comprises an elongated platform, supporting wheels rotatably mounted on the platform, a tank providing a storage chamber for spray liquid positioned on one end of the platform, said tank having an open nipple extended upwardly from the upper surface, a motor driven pump mounted on the platform, said pump having a suction connection and a discharge connection, a supply tube extended from the suction connection of the pump downwardly through said open nipple and to a point in the lower part of the tank, a spray tube extended from the discharge connection of the pump to spray nozzle supply tubes and said spray tube having a return connection extended therefrom through said open nipple and into said tank, a pair of posts extended upwardly from opposite sides of the platform and positioned at the forward end of the tank for supporting spray headers, a post mounted on the tank and extended upwardly therefrom, the post on the tank being spaced rearwardly from the posts at the forward end of the tank and positioned on the longitudinal center of the platform, a cross bar extended between the posts extended upwardly from the platform, a semi-circular band mounted on the posts with the ends secured to the posts extended upwardly from the platform and with the intermediate part supported by the post extended upwardly from the tank, spray headers pivotally mounted on the cross bar and positioned to slide on said band, springs secured to and extended from ends of the band to intermediate parts of the spray headers for returning the spray headers from folded positions extended longitudinally of the platform to outwardly extended positions, spray nozzle supply tubes connecting the spray headers to the spray tube extended from the discharge of the pump, and spray nozzles positioned at spaced points in the spray headers.

References Cited in the file of this patent
UNITED STATES PATENTS

| | | |
|---|---|---|
| 361,293 | Jaisle | Apr. 19, 1887 |
| 1,062,029 | Pillsbury | May 20, 1913 |
| 2,422,034 | Zeck | Feb. 15, 1949 |
| 2,548,209 | Foster | Apr. 10, 1951 |
| 2,548,482 | Kouril | Apr. 10, 1951 |
| 2,575,521 | Ireland | Nov. 20, 1951 |
| 2,690,355 | Waters | Sept. 28, 1954 |

FOREIGN PATENTS

| | | |
|---|---|---|
| 677,654 | Great Britain | Aug. 20, 1952 |